US012561060B2

(12) United States Patent
Ibrahim et al.

(10) Patent No.: US 12,561,060 B2
(45) Date of Patent: Feb. 24, 2026

(54) PARTIAL ADDRESS MEMORY REQUESTS

(71) Applicant: Advanced Micro Devices, Inc., Santa Clara, CA (US)

(72) Inventors: Mohamed Assem Abd Elmohsen Ibrahim, Santa Clara, CA (US); Shaizeen Dilawarhusen Aga, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 176 days.

(21) Appl. No.: 18/147,088

(22) Filed: Dec. 28, 2022

(65) Prior Publication Data

US 2024/0220122 A1     Jul. 4, 2024

(51) Int. Cl.
*G06F 3/06*     (2006.01)

(52) U.S. Cl.
CPC .......... *G06F 3/0613* (2013.01); *G06F 3/0659* (2013.01); *G06F 3/0673* (2013.01)

(58) Field of Classification Search
CPC ..... G06F 3/0613; G06F 3/0659; G06F 3/0673
See application file for complete search history.

(56) References Cited

U.S. PATENT DOCUMENTS

| | | | |
|---|---|---|---|
| 11,669,271 B2 | 6/2023 | Nag et al. | |
| 2005/0015378 A1* | 1/2005 | Gammel | ............. G06F 12/1009 |
| 2007/0121399 A1 | 5/2007 | Bains | |
| 2009/0128574 A1* | 5/2009 | Fujii | ...................... G06F 15/16 |
| | | | 345/541 |
| 2014/0181427 A1 | 6/2014 | Jayasena et al. | |
| 2021/0326063 A1 | 10/2021 | Nag et al. | |

OTHER PUBLICATIONS

U.S. Appl. No. 16/848,920, "Final Office Action", U.S. Appl. No. 16/848,920, Feb. 8, 2022, 12 pages.
U.S. Appl. No. 16/848,920, "Non-Final Office Action", U.S. Appl. No. 16/848,920, May 25, 2022, 10 pages.
U.S. Appl. No. 16/848,920, "Notice of Allowance", U.S. Appl. No. 16/848,920, Aug. 11, 2021, 10 pages.
U.S. Appl. No. 16/848,920, "Notice of Allowance", U.S. Appl. No. 16/848,920, Jan. 26, 2023, 13 pages.
Lee, Sukhan , et al., "Hardware Architecture and Software Stack for PIM Based on Commercial DRAM Technology : Industrial Product", ACM/IEEE 48th Annual International Symposium on Computer Architecture (ISCA) [retrieved Jan. 26, 2023]. Retrieved from the Internet <https://docplayer.net/227317779-Hardware-architecture-and-software-stack-for-pim-based-on-commercial-dram-technology.html>., Jun. 2021, 14 Pages.
21722737.0 , "Communication Pursuant to Article 94(3) EPC", EP Application No. 21722737.0, Jan. 2, 2024, 4 pages.

* cited by examiner

*Primary Examiner* — Jae U Yu
(74) *Attorney, Agent, or Firm* — FIG. 1 Patents

(57)     ABSTRACT

Partial address memory requests for data are described. In accordance with the described techniques, an accelerator receives a request for data that does not include address information for a data storage location from which the data is to be retrieved. The accelerator identifies at least one data storage location that includes data produced by the accelerator and retrieves the data from the at least one data storage location. A result is then output by the accelerator that includes the data retrieved from the at least one data storage location.

20 Claims, 4 Drawing Sheets

100 —

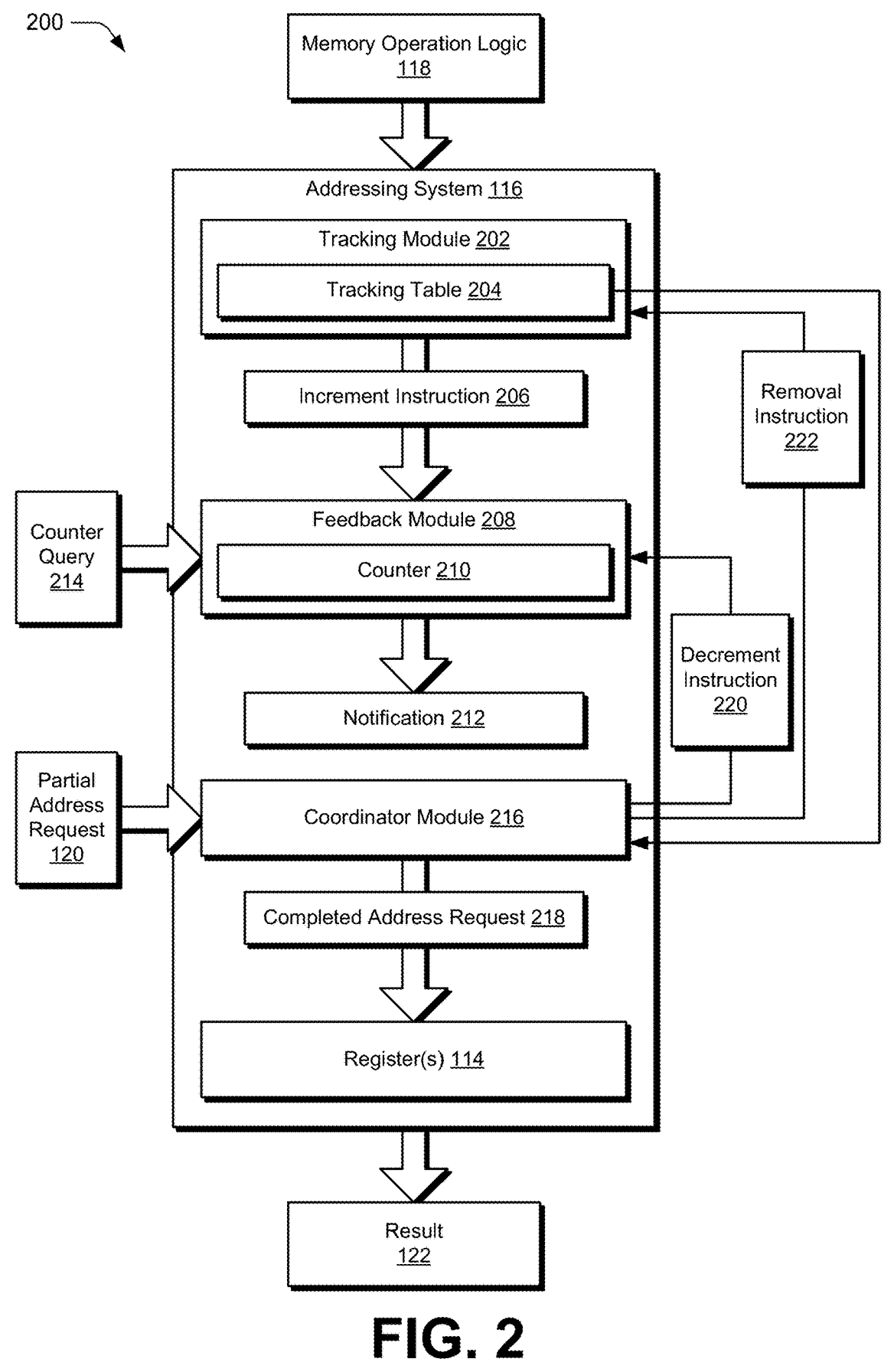

200

Memory Operation Logic
118

Addressing System 116

Tracking Module 202

Tracking Table 204

Increment Instruction 206

Removal Instruction 222

Counter Query 214

Feedback Module 208

Counter 210

Notification 212

Decrement Instruction 220

Partial Address Request 120

Coordinator Module 216

Completed Address Request 218

Register(s) 114

Result
122

FIG. 2

300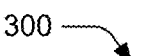

302
Receive, at an accelerator and from a host, a request for data produced by the accelerator

304
Identify, by the accelerator, at least one data storage location that includes the data produced by the accelerator

306
Maintain a table that tracks address information for data storage locations that include data produced by the accelerator

308
Output a result that includes the data produced by the accelerator

310
Modify the request to include address information for the at least one data storage location using the table

312
Remove the address information for the at least one data storage location from the table

FIG. 3

400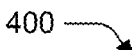

402
Load memory operation logic into an accelerator

404
Execute, by the accelerator, the memory operation logic

406
Identify at least one data storage location that includes data produced by the accelerator

408
Generate a read command that, when executed by a host, causes the host to request data from the at least one data storage location

410
Output a result that includes the read command to the host

FIG. 4

PARTIAL ADDRESS MEMORY REQUESTS

BACKGROUND

Computing device architectures utilize accelerators to optimize pipelines with different compute and memory requirements. For instance, a host that would otherwise be tasked with performing computations instead instructs an accelerator to perform the computations. The host then reads results generated by the accelerator from memory after the accelerator performs the computations and writes generated results to memory. One example of an accelerator is a processing-in-memory (PIM) component, which allows memory-intensive computations to be performed in memory.

This contrasts with standard computer architectures which communicate data back and forth between a memory and a remote processing unit. In terms of data communication pathways, remote processing units of conventional computer architectures are further away from memory than PIM components. As a result, conventional computer architectures suffer from increased data transfer latency, which can decrease overall computer performance. Thus, processing-in-memory components and other accelerators enable increased computer performance while reducing data transfer latency, contrasted with conventional computer architectures that implement remote processing hardware.

BRIEF DESCRIPTION OF THE DRAWINGS

FIG. 2 depicts an example of using an addressing system to respond to partial address memory requests.

FIG. 3 depicts a procedure in an example implementation of responding to partial address memory requests.

FIG. 4 depicts a procedure in an example implementation of generating a request for data directly from an accelerator that produces the data.

DETAILED DESCRIPTION

Overview

Figure 1:
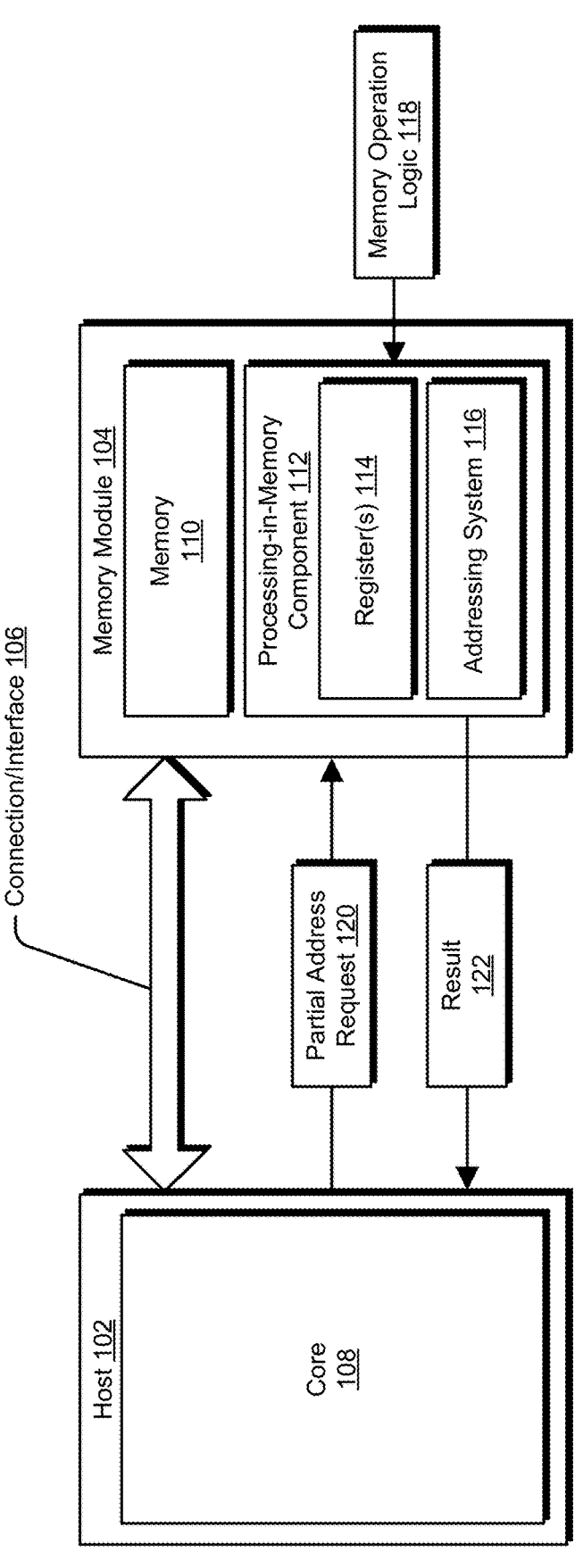
FIG. 1 is a block diagram of an example system having a host with a core and a memory module with a memory and a processing-in-memory component that implements an addressing system.

In an effort to increase computational speed, computing device architectures are designed to include accelerators that offload compute tasks from a processor device that would otherwise be used to perform the compute tasks in an architecture without accelerators. In conventional architectures, however, accelerators tasked with generating data as a result of performing various compute operations are further tasked with writing the generated data to a centralized output structure such as memory, a first input first output (FIFO) buffer, or other data structure accessible by both an accelerator and a controlling processing device. While these conventional architectures are helpful in alleviating a computational burden from the processing device, they introduce undue delay into a computational pipeline as a result of serialized data communication via the centralized output structure.

For instance, in a conventional architecture, a host processor assigns computational tasks to an accelerator, waits until the accelerator completes the assigned tasks and outputs data to a defined output structure, then reads the data output by the accelerator from the defined output structure. Many conventional architectures define a single communication pathway between the host processor and the centralized output structure. Thus, when extended to larger architectures where multiple accelerators are tasked with outputting data to the centralized output structure, the host processor is restricted by the single communication pathway with respect to how data output by the multiple accelerators is retrieved from the centralized output structure. For instance, in an example implementation where the centralized output structure is a buffer, a host processor is unable to read data from the buffer while an accelerator is writing data to the buffer, thus inducing delay where one computing component is forced to wait for another to complete operations before it can proceed. This delay is further compounded in dynamic architectures where different accelerators produce data at different rates.

To address these conventional problems, partial address memory requests are described. In implementations, a system includes a memory module having a memory and an accelerator (e.g., a processing-in-memory component). The memory module is communicatively coupled to a core of a host, such as a core of a host processor. Using the techniques described herein, the accelerator is configured to process data stored in the memory to produce data that is configured for consumption (e.g., further processing) by the host. Advantageously, the accelerator is configured to produce the data for consumption by the host independent of (e.g., without) traffic on a connection that communicatively couples the memory module to the host. Thus, in contrast to conventional system that perform computational tasks by reading data from memory, transferring the data from memory to a host processor, and performing computations at the host processor using the transferred data, the accelerator is configured to produce data by processing data stored in memory without transferring the data stored in memory to a host processor.

In accordance with one or more implementations, the accelerator includes at least one data storage component, such as a register, a cache, a scratchpad memory, a local store, or other data storage component configured to store data produced by the accelerator locally (e.g., independent of transmitting data produced by the accelerator to memory of the memory module). The accelerator is further configured to execute memory operation logic that causes the accelerator to monitor when at least one local data storage location includes data prepared by the accelerator that is ready for consumption by a processing device (e.g., by a host processor). In response to detecting that a local data storage location includes data prepared by the accelerator for consumption by the processing device, the accelerator adds address information for the local data storage location to a tracking table and increments a counter that describes a quantity of data storage locations represented in the tracking table.

In some implementations, executing the memory operation logic further causes the accelerator to notify the processing device that data produced by the accelerator is available for retrieval by the processing device, directly from the accelerator. Such a notification enables the processing device to send a request to the accelerator for data. Advantageously, the memory operation logic enables the accelerator to respond to a request for data received from the processing device even in scenarios where the request does not include address information specifying one or more data storage locations from which the requested data is to be retrieved. By maintaining the address information for local data storage locations that include data prepared by the accelerator for consumption by the processing device, the accelerator is configured to update the processing device request to include the address information maintained in the tracking table. In this manner, the accelerator is configured to generate a completed address request from a request that lacks address information for one or more accelerator-local data storage locations, such that the request is redirected to the one or more accelerator-local data storage locations.

Executing the memory operation logic thus enables an accelerator to directly respond to a request for data with data maintained in local data storage components (e.g., registers), avoiding data movement operations required by conventional systems, such as avoiding write operations by the accelerator to a central memory that is accessible by a processor to retrieve data. Further, the techniques described herein mitigate a number of unsuccessful data requests sent by a processing device to an accelerator by proactively notifying the processing device when data produced by the accelerator and locally stored at the accelerator is available for consumption by the processing device. In some implementations, the accelerator is configured to generate a read command to be executed by a host processor in response to producing data for consumption by the host processor. For instance, the accelerator detects that a local data storage location includes data ready for consumption by a host and generates a read command that, when executed by a host (e.g., a memory controller of a host processing device), causes the host to transmit a request for data to the accelerator. In some implementations, the read command generated by the accelerator and executed by the host causes the host to transmit a partial address request for data to the accelerator, where the partial address request does not include address information for the one or more accelerator-local data storage locations that include data for consumption by the host. Alternatively, in some implementations the read command generated by the accelerator and executed by the host includes address information for one or more accelerator-local data storage locations and causes the host to access data from data storage locations identified by the included address information.

Although techniques are described herein with respect to a single accelerator (e.g., an accelerator configured as a processing-in-memory component), the described techniques are configured for implementation by multiple accelerators in parallel (e.g., simultaneously). For instance, in an example scenario where memory is configured as dynamic random-access memory (DRAM), a processing-in-memory component is included at each hierarchical DRAM component (e.g., channel, bank, array, and so forth). Continuing this example where memory operation logic is transmitted to the memory module via a command from a host processor, the memory operation logic is provided to each processing-in-memory component in parallel. Thus, rather than requiring multiple commands, one for each memory component, to respond to requests for data, the described techniques enable a single command that includes a partial address request for data to cause each processing-in-memory component to respond with data produced by the processing-in-memory component and stored locally for consumption by the host processor.

By processing data to generate output data for consumption by a host, using an accelerator such as a processing-in-memory component, the described techniques do not cause additional traffic on the interface between a host processor and a memory module implementing the processing-in-memory component. This is not possible using conventional systems, which utilize the core of the remote host processor to perform operations involving data stored in memory. The described techniques further advantageously save cycles of the remote host processor, which reduces system power consumption and frees the host processor to perform additional operations relative to conventional systems.

In some aspects, the techniques described herein relate to a system including an accelerator configured to receive a request for data, identify at least one data storage location that includes data produced by the accelerator, and output a result that includes the data produced by the accelerator retrieved from the at least one data storage location.

In some aspects, the techniques described herein relate to a system, wherein the request for data is a partial address request that does not include address information for the at least one data storage location.

In some aspects, the techniques described herein relate to a system, wherein the request for data is received from a host that includes a core, wherein the accelerator is configured to output the result to the host.

In some aspects, the techniques described herein relate to a system, wherein the core is a central processing unit, a graphics processing unit, a field programmable gate array, or a digital signal processor.

In some aspects, the techniques described herein relate to a system, wherein the at least one data storage location includes at least one of a register, a cache, a scratchpad, or a local store of the accelerator.

In some aspects, the techniques described herein relate to a system, further including a memory of a memory module, wherein the accelerator is a processing-in-memory component of the memory module and wherein the processing-in-memory component is configured to produce the data by processing bits stored in the memory of the memory module.

In some aspects, the techniques described herein relate to a system, wherein the accelerator is configured to produce the data independent of traffic on a connection between the accelerator and a host from which the request for data was received.

In some aspects, the techniques described herein relate to a system, wherein the accelerator is further configured to monitor the at least one data storage location and transmit a notification that the data produced by the accelerator is available for consumption responsive to detecting a write operation to the at least one data storage location.

In some aspects, the techniques described herein relate to a system, wherein the notification does not include information specifying an address of the at least one data storage location and the request for the data produced by the accelerator is received in response to the accelerator transmitting the notification.

In some aspects, the techniques described herein relate to a system, wherein the accelerator is further configured to maintain a table that includes information describing one or more data storage components including data that is prepared for consumption by a host, wherein the accelerator is configured to identify the at least one data storage location using the table.

In some aspects, the techniques described herein relate to a system, wherein the accelerator is further configured to remove an entry from the table for the at least one data storage location in response to outputting the result.

In some aspects, the techniques described herein relate to a system, wherein the accelerator is configured to remove the entry from the table for the at least one data storage location in response to receiving an acknowledgment from a host indicating that the result was successfully received.

In some aspects, the techniques described herein relate to a system, further including a plurality of accelerators, wherein in response to receiving the request for data, each of the plurality of accelerators: identify at least one data storage location that includes data produced by the accelerator; and output a result that includes the data produced by the accelerator retrieved from the at least one data storage location.

In some aspects, the techniques described herein relate to a system including an accelerator configured to identify at least one data storage location that includes data produced by the accelerator, generate a read command that causes a host to request data from the at least one data storage location, and output a result that includes the read command to the host.

In some aspects, the techniques described herein relate to a system, wherein the host includes a memory controller and a core, wherein the accelerator is configured to output the result that includes the read command to the memory controller of the host.

In some aspects, the techniques described herein relate to a system, further including a memory of a memory module, wherein the accelerator is a processing-in-memory component of the memory module.

In some aspects, the techniques described herein relate to a system, wherein the accelerator is configured to produce the data, identify the at least one data storage location that includes the data, and generate the read command independent of traffic on a connection between the accelerator and the host.

In some aspects, the techniques described herein relate to a method including receiving, at an accelerator, a partial address request for data from a host, the partial address request not including address information for retrieving data from the accelerator, identifying, by the accelerator, at least one data storage location that includes data produced by the accelerator, and outputting, by the accelerator, a result that includes the data produced by the accelerator retrieved from the at least one data storage location.

In some aspects, the techniques described herein relate to a method, further including producing, by the accelerator, the data by processing bits stored in memory of a memory module.

In some aspects, the techniques described herein relate to a method, wherein producing the data is performed independent of traffic on a connection between the accelerator and the host.

FIG. 1 is a block diagram of a system 100 that includes a host with a core and further includes a memory module with a memory and a processing-in-memory component. In particular, the system 100 includes host 102 and memory module 104, where the host 102 and the memory module 104 are communicatively coupled via connection/interface 106. In one or more implementations, the host 102 includes core 108, and the memory module 104 includes memory 110 and processing-in-memory component 112.

In accordance with the described techniques, the host 102 and the memory module 104 are coupled to one another via a wired or wireless connection, which is depicted in the illustrated example of FIG. 1 as the connection/interface 106. Example wired connections include, but are not limited to, buses (e.g., a data bus), interconnects, traces, and planes. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

The host 102 is an electronic circuit that performs various operations on and/or using data in the memory 110. Examples of the host 102 and/or the core 108 include, but are not limited to, a central processing unit (CPU), a graphics processing unit (GPU), a field programmable gate array (FPGA), an accelerated processing unit (APU), and a digital signal processor (DSP). For example, the core 108 is a processing unit that reads and executes instructions (e.g., of a program), examples of which include to add, to move data, and to branch. Although one core 108 is depicted in the illustrated example, in variations, the host 102 includes more than one core 108 (e.g., the host 102 is a multi-core processor).

In one or more implementations, the memory module 104 is a circuit board (e.g., a printed circuit board), on which the memory 110 is mounted and includes the processing-in-memory component 112. In some variations, one or more integrated circuits of the memory 110 are mounted on the circuit board of the memory module 104, and the memory module 104 includes one or more processing-in-memory components 112. Examples of the memory module 104 include, but are not limited to, a TransFlash memory module, a single in-line memory module (SIMM), and a dual in-line memory module (DIMM). In one or more implementations, the memory module 104 is a single integrated circuit device that incorporates the memory 110 and the processing-in-memory component 112 on a single chip. In some examples, the memory module 104 is composed of multiple chips that implement the memory 110 and the processing-in-memory component 112 that are vertically ("3D") stacked together, are placed side-by-side on an interposer or substrate, or are assembled via a combination of vertical stacking or side-by-side placement.

The memory 110 is a device or system that is used to store information, such as for immediate use in a device (e.g., by the core 108 of the host 102 and/or by the processing-in-memory component 112). In one or more implementations, the memory 110 corresponds to semiconductor memory where data is stored within memory cells on one or more integrated circuits. In at least one example, the memory 110 corresponds to or includes volatile memory, examples of which include random-access memory (RAM), dynamic random-access memory (DRAM), synchronous dynamic random-access memory (SDRAM), and static random-access memory (SRAM).

In some implementations, the memory 110 corresponds to or includes a cache memory of the core 108 and/or the host 102 such as a level 1 cache, a level 2 cache, a level 3 cache, and so forth. For example, the memory 110 represents high bandwidth memory (HBM) in a 3D-stacked implementation. Alternatively or additionally, the memory 110 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM). The memory 110 is thus configurable in a variety of ways that support memory verification (e.g., of the memory 110) using processing-in-memory without departing from the spirit or scope of the described techniques.

The processing-in-memory component 112 is an example of an accelerator utilized by the host 102 to offload performance of computations (e.g., computations that would otherwise be performed by the core 108 in a conventional computing device architecture). Although described with respect to implementation by the processing-in-memory component 112, the techniques described herein are configured for implementation by a variety of different accelerator configurations (e.g., an accelerator other than a processing-in-memory component). Generally, the processing-in-memory component 112 is configured to process processing-in-memory instructions (e.g., received from the core 108 via the connection/interface 106). The processing-in-memory component 112 is representative of a processor with example processing capabilities ranging from relatively simple (e.g., an adding machine) to relatively complex (e.g., a CPU/GPU compute core). In an example, the processing-in-memory component 112 processes instructions using data stored in the memory 110.

Processing-in-memory contrasts with standard computer architectures which obtain data from memory, communicate the data to a remote processing unit (e.g., the core 108 of the host 102), and process the data using the remote processing unit (e.g., using the core 108 of the host 102 rather than the processing-in-memory component 112). In various scenarios, the data produced by the remote processing unit as a result of processing the obtained data is written back to memory, which involves communicating the produced data over the connection/interface 106 from the remote processing unit to memory. In terms of data communication pathways, the remote processing unit (e.g., the core 108 of the host 102) is further away from the memory 110 than the processing-in-memory component 112, both physically and topologically. As a result, conventional computer architectures suffer from increased data transfer latency, reduced data communication bandwidth, and increased data communication energy, particularly when the volume of data transferred between the memory and the remote processing unit is large, which can also decrease overall computer performance.

Thus, the processing-in-memory component 112 enables increased computer performance while reducing data transfer energy as compared to standard computer architectures that implement remote processing hardware. Further, the processing-in-memory component 112 alleviates memory performance and energy bottlenecks by moving one or more memory-intensive computations closer to the memory 110. Although the processing-in-memory component 112 is illustrated as being disposed within the memory module 104, in some examples, the described benefits of partial address memory requests are extendable to near-memory processing implementations in which an accelerator (e.g., the processing-in-memory component 112) is disposed in closer proximity to the memory 110 (e.g., in terms of data communication pathways) than the core 108 of the host 102.

The processing-in-memory component 112 is depicted as including one or more registers 114. Each of the one or more registers 114 is representative of a data storage location in the processing-in-memory component 112 that is configured to store data (e.g., one or more bits of data). Although described herein in the example context of registers, the one or more registers 114 are representative of any suitable configuration of one or more data storage components, such as a cache, a scratchpad memory, a local store, or other type of data storage component configured to store data produced by the accelerator locally (e.g., independent of transmitting data produced by the accelerator to memory of the memory module). Each of the one or more registers 114 is associated with an address that defines where data stored by the respective register is located within the processing-in-memory component 112.

By virtue of an associated address, each of the one or more registers 114 are uniquely identifiable (i.e., distinguishable from other ones of the one or more registers 114). For instance, in some implementations each of the one or more registers 114 has an identifier assigned to the register that uniquely identifies the register relative to others of the one or more registers 114. In an example scenario where the one or more registers 114 include N different registers, the system 100 uses $\log_2(N)$ bits to uniquely identify the registers 114. In other implementations, an accelerator utilizes a local cache to store data and address information uniquely identifies different locations within the cache (e.g., the one or more registers 114 are representative of different locations within a local cache for an accelerator, where the different locations are addressed by block identifiers).

The processing-in-memory component 112 is further depicted as including an addressing system 116. The addressing system 116 is representative of functionality of an accelerator (e.g., the processing-in-memory component 112) to service a request for data that does not fully specify an address for a data storage location from which data is to be retrieved and route the request to an appropriate data storage location (e.g., one or more of the registers 114).

The processing-in-memory component 112 is illustrated as receiving memory operation logic 118, which represents instructions that are executable by the processing-in-memory component 112 to cause the processing-in-memory component 112 to perform operations relative to the memory 110 (e.g., to service a request received from the host 102). In one example, the processing-in-memory component 112 receives the memory operation logic 118 from the host 102 and/or the core 108 (e.g., via the interface 106). Alternatively or additionally, the processing-in-memory component 112 receives (e.g., loads) the memory operation logic 118 from a dedicated portion of the memory 110 (e.g., an externally non-addressable memory of a bank of the memory 110). Alternatively or additionally, the processing-in-memory component 112 receives (e.g., loads) the memory operation logic 118 from a defined location within the system 100 (e.g., independent of creating traffic to/from the memory module 104 via the interface 106).

In some implementations, the memory operation logic 118 is received by the processing-in-memory component 112 as part of a command from the host 102 (e.g., as part of a command transmitted to the memory module 104 from the host 102). The processing-in-memory component 112 is thus configured to perform techniques described herein responsive to an instruction by the host 102. Alternatively or additionally, the processing-in-memory component 112 is configured to execute instructions set forth in the memory operation logic 118 independent of receiving a command or instruction from the host 102. For instance, in an example implementation the processing-in-memory component 112 is configured to store the memory operation logic 118 locally (e.g., in one or more registers 114 of the processing-in-memory component 112).

The memory operation logic 118 includes instructions that are executable by the processing-in-memory component 112 to perform the techniques described herein. In accordance with the described techniques, execution of the memory operation logic 118 causes the processing-in-memory component 112 to process data obtained from one or more locations in the memory 110 and/or the one or more registers 114, generate output data as a result of the processing, and store the output data in one or more locations in the memory 110 and/or the one or more registers 114. Execution of the memory operation logic 118 further causes the processing-in-memory component 112 to track address information for the one or more registers 114 that are used to store the output data generated as a result of processing data from the memory 110.

In some implementations, execution of the memory operation logic 118 causes the processing-in-memory component 112 to notify the host 102 that output data generated by the processing-in-memory component 112 is available for consumption by the host 102. Execution of the memory operation logic 118 further causes the processing-in-memory component 112 to respond to a partial address request 120 received from the host 102. In implementations, the partial address request 120 is a request from the host 102 for data stored at the processing-in-memory component 112 (e.g., for data stored in the one or more registers 114).

In contrast to a complete address request, the partial address request 120 does not include address information for at least one data storage location in which requested data is maintained. With respect to the illustrated example of FIG. 1, the partial address request 120 is representative of a request for data from the processing-in-memory component 112 that excludes address information for one or more of the registers 114 that are used by the processing-in-memory component 112 to store the requested data. Execution of the memory operation logic 118 causes the addressing system 116 to generate a completed address request from the partial address request 120 that adds address information to the partial address request 120 or otherwise redirects the partial address request 120 to one or more registers 114 of the processing-in-memory component 112 storing data prepared for consumption by the host 102.

The memory operation logic 118 is further representative of one or more instructions that cause the processing-in-memory component 112 to output a result 122. In some implementations, the result 122 includes data that is requested by the partial address request 120 and retrieved from the one or more registers 114 as a result of the addressing system 116 generating a completed address request from the partial address request 120. Alternatively or additionally, in some implementations the result 122 includes a read command that causes a host to request data from at least one data storage location of the processing-in-memory component 112.

For instance, in some implementations executing the memory operation logic 118 causes the processing-in-memory component 112 to generate the result 122 independent of receiving a partial address request 120 from the host 102. In an example scenario, executing the memory operation logic 118 causes the processing-in-memory component 112 to monitor data storage locations (e.g., registers 114) and identify when at least one of the monitored data storage locations includes data ready for consumption by the host 102 (e.g., when at least one of the registers 114 is full). Continuing this example scenario, in response to identifying that at least one local data storage location includes data prepared for consumption by the host 102, the processing-in-memory component 112 generates a read command that, when executed by the host 102, causes the host 102 to request data from at least one data storage location in the processing-in-memory component 112.

In some implementations, executing this read command included in the result 122 causes the host 102 to send a partial address request 120 to the processing-in-memory component 112. In other implementations, the read command included in the result 122 includes address information for the at least one data storage location in the processing-in-memory component 112, such that executing the read command causes the host 102 to request data directly from the data storage location address(es) specified in the read command. In some implementations, the processing-in-memory component 112 is configured to output a result 122 that includes a read command to a memory controller of the host 102 (not depicted), such that the read command is inserted into a queue of commands to be executed by the memory controller of the host 102.

Because the processing-in-memory component 112 executes the memory operation logic 118 to generate output data by processing data stored in memory 110, the processing-in-memory component 112 advantageously performs the techniques described herein with minimal impact on the system 100 (e.g., without causing traffic on the connection/interface 106). For instance, the processing-in-memory component 112 processes data maintained in one or more locations of the memory 110 to generate output data and stores the output data locally (e.g., in one or more of the registers 114) "in the background" with respect to the host 102 and the core 108, which frees up cycles of the host 102 and/or the core 108, reduces memory bus traffic (e.g., reduces traffic on the connection/interface 106), and reduces power consumption relative to performing operations at the host 102 and/or the core 108. Notably, because the processing-in-memory component 112 is closer to the memory 110 than the core 108 of the host 102 in terms of data communication pathways, generating output data by processing data stored in memory 110 is generally completable in a shorter amount of time using the processing-in-memory component 112 than if the evaluation were performed using the core 108 of the host 102.

Further, by implementing the addressing system 116, the processing-in-memory component 112 is configured to enable direct access by the host 102 to retrieve data stored locally at the processing-in-memory component 112 (e.g., within one or more of the registers 114). By enabling direct access to retrieved data from the registers 114, the techniques described herein advantageously avoid the need to perform additional operations that would be required by conventional computing architectures. For instance, the described techniques obviate the need to for the processing-in-memory component 112 to perform operations to write data to one or more locations in memory 110 for subsequent retrieval by the host 102, write flags to memory 110 indicating that data is available for retrieval from the registers 114, or combinations thereof, thereby mitigating a data movement cost associated with communicating data produced by the processing-in-memory component 112 to the host 102 through memory 110.

In some implementations, the addressing system 116 further reduces traffic on the connection/interface 106 by causing the host 102 to communicate a partial address request 120 only in response to receiving a notification from the processing-in-memory component 112 indicating that data maintained in the registers 114 is ready for host 102 consumption. Functionality of the addressing system 116 is described in further detail below with respect to FIG. 2.

FIG. 2 depicts an example 200 of using an addressing system to respond to partial address memory requests.

The example 200 is depicted as including the addressing system 116 of the processing-in-memory component 112. The addressing system 116 is depicted as receiving (e.g., loading) and executing instructions included in the memory operation logic 118. The addressing system 116 includes a tracking module 202, which represents functionality of the addressing system 116 to maintain a tracking table 204 that includes address information for one or more data storage locations of the processing-in-memory component 112 storing data prepared for consumption by the host 102 (e.g., address information for one or more of the registers 114).

As part of executing instructions included in the memory operation logic 118, the addressing system 116 causes the tracking module 202 to monitor one or more local data storage locations of the processing-in-memory component 112 (e.g., monitor the one or more registers 114). Executing instructions included in the memory operation logic 118 further causes the tracking module 202 to add address information for a monitored data storage location to the tracking table 204 when the monitored data storage location includes data produced by the processing-in-memory component 112 (e.g., responsive to a write operation to one of the registers 114, responsive to one or more of the registers 114 being full, and so forth).

As further part of executing instructions included in the memory operation logic 118, the addressing system 116 causes the tracking module 202 to output an increment instruction 206 to a feedback module 208 in response to adding address information to the tracking table 204. The increment instruction 206 causes the feedback module 208 to increment a value maintained by a counter 210, which indicates a number of data storage locations of the processing-in-memory component 112 that include data ready for consumption by the host 102. For instance, the counter 210 represents functionality of the feedback module 208 to maintain an integer value indicating a number of the registers 114 that include data produced by the processing-in-memory component 112 and ready for consumption by the host 102.

In addition to incrementing the integer value maintained by the counter 210 in response to receiving the increment instruction 206 from the tracking module 202, the feedback module 208 is configured to generate a notification 212 indicating that one or more data storage locations of the processing-in-memory component 112 include data available for processing by the host 102. For instance, the feedback module 208 generates the notification 212 in response to a value of the counter 210 being greater than zero, in response to incrementing the value of the counter 210, or combinations thereof.

The notification 212 is representative of information indicating that one or more data storage locations in the processing-in-memory component 112 include data available for consumption by the host 102. In some implementations, the notification 212 includes a binary indication of available data stored at the processing-in-memory component 112 and does not include address information indicating a location at which data stored at the processing-in-memory component 112 is retrievable (e.g., does not include address information for the one or more registers 114 of the processing-in-memory component 112). In some implementations, the feedback module 208 is configured to include address information indicating the location at which data stored at the processing-in-memory component 112 is retrievable (e.g., address information for one or more of the registers 114). In implementations, the addressing system 116 is configured to output the notification 212 by communicating the notification 212 to the host 102 (e.g., via the interface 106).

In some implementations, the addressing system 116 outputs the notification 212 to the host 102 independent of receiving a request for information, instruction, or other communication from the host 102. For instance, the feedback module 208 generates the notification 212 and the addressing system 116 communicates the notification 212 to the host 102 in response to the tracking module 202 adding address information to the tracking table 204, and independent of any previous traffic on the interface 106 or other communication interface between the host 102 and the memory module 104. Alternatively or additionally, in some implementations the feedback module 208 generates the notification 212 in response to receiving a request from the host 102 for information regarding whether the processing-in-memory component 112 is storing data available for consumption by the host 102.

For instance, in the illustrated example of FIG. 2, the feedback module 208 is depicted as receiving a counter query 214. The counter query 214 is representative of a request received by the processing-in-memory component 112 from the host 102 (e.g., via the interface 106) for information regarding whether one or more data storage locations of the processing-in-memory component 112 include data available for consumption by the host 102. In an example implementation where the feedback module 208 receives a counter query 214 from the host 102, the feedback module 208 generates the notification 212 in response to receiving the counter query 214. In this example implementation, the notification 212 includes a binary indication (e.g., yes or no) as to whether one or more data storage locations of the processing-in-memory component 112 are storing data available for consumption by the host. The binary indication in the notification 212 is generated by the feedback module 208 based on an integer value of the counter 210 (e.g., "yes" if the integer value is greater than zero or "no" if the integer value is zero).

The addressing system 116 is further depicted as receiving a partial address request 120. The partial address request 120 is representative of a request for data from the processing-in-memory component 112 that does not include complete address information for one or more of the registers 114 that are used by the processing-in-memory component 112 to store the requested data. For instance, in some implementations the partial address request 120 does not include any address information for one or more data storage locations at which data prepared by an accelerator (e.g., the processing-in-memory component 112) is being stored. In other implementations, the partial address request 120 includes an incomplete portion of address information for one or more data storage locations (e.g., include address information for a register file of the one or more registers 114 and exclude address information such as an index or register identifier describing where data prepared by the processing-in-memory component 112 is stored).

In some implementations, the partial address request 120 is received by the addressing system 116 from the host 102 in response to transmitting the notification 212 to the host 102. For instance, in an example scenario, the tracking module 202 identifies that one or more of the registers 114 includes data ready for consumption by the host 102. In some implementations, the tracking module 202 identifies that a data storage location (e.g., one of the registers 114) includes data that is ready for consumption in response to the data storage location being full. Alternatively or additionally, the tracking module 202 identifies that a data storage location includes data that is ready for consumption in response to the data storage location storing a threshold amount of data, where the threshold amount of data is configurable as any amount of data. Alternatively or additionally, the tracking module 202 identifies that a data storage location includes data that is ready for consumption in response to the data storage location storing data for a threshold amount of time, where the threshold amount of time is configurable as any duration. Alternatively or additionally, the tracking module 202 identifies that a data storage location includes data that is ready for consumption in response to an accelerator (e.g., the processing-in-memory component 112) writing data to the data storage location.

In response to the tracking module 202 identifying that one or more data storage locations include data ready for consumption by the host 102, the feedback module 208 transmits a notification 212 to the host 102 indicating that data produced by the processing-in-memory component 112 is ready for consumption. In response to receiving the notification 212, the host 102 is caused to transmit a request to the processing-in-memory component 112 for data produced by the processing-in-memory component 112. In implementations where the notification 212 does not include address information for one or more data storage locations storing data ready for consumption by the host 102, the request received from the host 102 is represented as the partial address request 120 in the illustrated example of FIG. 2.

In implementations where the partial address request 120 lacks at least some address information for requested data (e.g., requests data from the processing-in-memory component 112 and does not include address information for at least one of the registers 114 storing the requested data), the addressing system 116 employs a coordinator module 216 to generate a completed address request 218 from the partial address request 120. The completed address request 218 is representative of an updated version of the partial address request 120, where the updated version includes address information that was not included in the partial address request 120. To do so, the coordinator module 216 is configured to access information maintained in the tracking table 204, as indicated by the arrow connecting the tracking module 202 to the coordinator module 216.

In an example implementation, in response to receiving the partial address request 120, the coordinator module 216 accesses the tracking table 204 and generates the completed address request 218 by modifying the partial address request 120 to include address information for one or more data storage locations local to the processing-in-memory component 112 (e.g., address information for the registers 114) that are indicated in the tracking table 204 as having data ready for consumption by the host 102. Advantageously, by generating the completed address request 218 to include address information represented in the tracking table 204 upon receiving the partial address request 120, the techniques described herein enable the processing-in-memory component 112 to respond to a request for data with data that was produced concurrently during transmission of the partial address request 120.

For instance, consider an example scenario where the feedback module 208 generates a notification 212 to indicate that a first data storage location includes data produced by the processing-in-memory component 112 that is ready for consumption by the host 102. In this example scenario, receiving the notification 212 causes the host 102 to generate a partial address request 120 to request data from the processing-in-memory component 112. In this example scenario, after generating the notification 212 and prior to receipt of the partial address request 120, the processing-in-memory component 112 produces additional data that is ready for consumption by the host 102 and stores the additional data in a second data storage location. In the example scenario, address information for both the first and second data storage locations is added to the tracking table 204.

Continuing the example scenario, upon receipt of the partial address request 120, the coordinator module 216 is configured to generate a completed address request 218 that includes address information for both the first and second data storage locations, leveraging information maintained in the tracking table 204. This advantageously enables the processing-in-memory component 112 to respond to a request for data with additional data than would be provided if the request had been addressed to a specific location. For instance, if the host 102 generated an addressed request for data from the first data storage location in response to receiving the notification 212, a response to the addressed request generated by conventional systems would not include the data from the second data storage location.

The completed address request 218 is thus representative of the addressing system 116 redirecting the partial address request 120 to one or more data storage locations (e.g., at least one of the registers 114) that include information prepared by the processing-in-memory component 112 for consumption by the host 102. Further, although illustrated in the context of being performed by a single accelerator (e.g., a single processing-in-memory component 112), the techniques described herein are configured for simultaneous performance by a plurality of different accelerators (e.g., a plurality of different processing-in-memory components 112). For instance, in an example implementation where the memory module 104 implements multiple processing-in-memory components 112, each processing-in-memory component 112 is configured to include its own addressing system 116. In this manner, in response to receiving a single partial address request 120 at the memory module 104, the single partial address request 120 is communicated to each of the plurality of processing-in-memory components 112 and each of the plurality of processing-in-memory components 112 is configured to generate a respective completed address request 218. In one or more implementations where the single partial address request 120 is communicated to multiple accelerators (e.g., multiple processing-in-memory components), arbitration is performed among the multiple accelerators to determine one or more of the multiple accelerators will generate a respective completed address request 218 for the single partial address request 120. Arbitration criteria for deciding which one or more of the multiple accelerators will generate a respective completed address request 218 include which of the multiple accelerators is a less frequent producer, an age of data produced by an accelerator, an identifier associated with an accelerator, pre-defined priority criteria, and so forth. The completed address request 218 generated by each respective processing-in-memory component 112 redirects the single partial address request 120 to one or more data storage locations that are storing data that is prepared for consumption by the host 102.

Although described with respect to receiving a partial address request 120 when the tracking table 204 includes information specifying that one or more data storage locations include data prepared by an accelerator for consumption by a host, in some implementations the accelerator receives a partial address request 120 when the tracking table 204 does not include address information for one or more data storage locations (e.g., when data is not ready for consumption by the host). For instance, in an example scenario the host 102 is connected to one or more accelerators (e.g., one or more processing-in-memory components 112).

In this example scenario, the host 102 is configured to send periodic requests for data to each of the one or more accelerators (e.g., periodically send a partial address request 120 to each of the one or more accelerators) to check whether data has been prepared for consumption. In such an example scenario, the host 102 is configured to transmit the partial address request 120 to an accelerator independent of (e.g., without) receiving a notification 212 from the accelerator.

Continuing this example scenario, if the partial address request 120 is received by the accelerator when the tracking table 204 of the addressing system 116 implemented by the accelerator does not include address information (e.g., when data has not been prepared for consumption, or is otherwise unavailable for consumption, by the host 102), the accelerator is configured to transmit a negative acknowledgement message (NACK) to the host 102. The NACK indicates to the host 102 that the accelerator does not have stored data prepared for consumption by the host 102. Alternatively or additionally, in some implementations an accelerator that receives a partial address request 120 when its tracking table 204 does not include address information for one or more data storage locations, the accelerator is configured to wait a threshold period of time before responding to the host.

This threshold period of time is configurable as any suitable duration. In implementations where the tracking table 204 does not include address information upon expiration of the threshold period of time, the accelerator is configured to send a NACK in response to the host from which the partial address request 120 was received. Alternatively, if the tracking table 204 includes address information for one or more data storage locations upon expiration of the threshold period of time, the accelerator proceeds to generate a completed address request 218 and output a result 122 that includes data stored in the one or more data storage locations.

By redirecting the partial address request 120 to one or more data storage locations (e.g., one or more registers 114) that include data prepared for consumption by the host 102, the addressing system 116 is useable by the processing-in-memory component 112 to generate a result 122. Alternatively, instead of receiving a partial address request 120 from the host 102, in some implementations an accelerator (e.g., the processing-in-memory component 112) receives a completed address request 218 from the host 102. For instance, in accordance with one or more implementations where the notification 212 includes address information for one or more data storage locations that are storing data prepared for consumption by the host 102, the host uses the address information to generate and transmit a completed address request 218 to the accelerator. Upon receipt of such a completed address request 218 from the host 102, the accelerator implementing the addressing system 116 generates the result 122. In some implementations, the result 122 includes data retrieved from the one or more data storage locations that are represented by address information included in the completed address request 218. In some implementations, the result 122 additionally includes information maintained in the tracking table 204, such as index or address information for the one or more data storage locations from which data included in the result 122 was received. The processing-in-memory component 112 is configured to output the result 122. In some implementations, the processing-in-memory component 112 outputs the result 122 by communicating the result 122 to the host 102 (e.g., via the interface 106).

Alternatively or additionally, in some implementations the result 122 is representative of a read command that causes a host to request data at least one data storage location of the processing-in-memory component 112. For instance, in some implementations executing the memory operation logic 118 causes the processing-in-memory component 112 to generate the result 122 independent of receiving a partial address request 120 from the host 102. In an example scenario, executing the memory operation logic 118 causes the addressing system 116 to generate a completed address request 218 in response to the tracking module 202 adding address information for one or more data storage locations to the tracking table 204. For instance, in response to detecting that the tracking table 204 includes address information for one or more of the registers 114, indicating that the one or more of the registers 114 include data ready for consumption by the host 102 (e.g., responsive to the counter 210 indicating an integer value of one or more), the coordinator module 216 generates a completed address request 218 with address information for the one or more of the registers 114.

In this example scenario, the addressing system 116 is configured to generate the result 122 as including the completed address request 218. In this example scenario, the completed address request 218 is configured as a read command that, when executed by the host 102, causes the host 102 to request data from at least one data storage location in the processing-in-memory component 112. Alternatively or additionally, the result 122 is generated to include a partial address request read command such that, when executed by the host 102, the partial address read command causes the host 102 to transmit a partial address request 120 to the processing-in-memory component 112.

Thus, in some implementations, executing the read command included in the result 122 causes the host 102 to send a partial address request 120 to the processing-in-memory component 112. In other implementations, the read command included in the result 122 includes address information for the at least one data storage location in the processing-in-memory component 112, such that executing the read command causes the host 102 to request data directly from the data storage location address(es) specified in the read command. In some implementations, the processing-in-memory component 112 is configured to output a result 122 that includes a read command to a memory controller of the host 102, such that the read command is inserted into a queue of commands to be executed by the memory controller of the host 102.

After transmitting a result 122 to the host 102 that includes data retrieved from one or more data storage locations local to the processing-in-memory component 112 (e.g., data retrieved from one or more of the registers 114), the addressing system 116 updates the tracking table 204 and the counter 210 to indicate that the data has been provided to the host 102. For instance, the coordinator module 216 transmits a decrement instruction 220 to the feedback module 208, which specifies an integer number by which the counter 210 value should be decreased. In an example implementation where the result 122 includes data retrieved from three different registers, the decrement instruction 220 specifies that a value of the counter 210 should be decreased by three.

The coordinator module 216 is further configured to transmit a removal instruction 222 to the tracking module

17

202. The removal instruction 222 causes the tracking module 202 to remove address information from the tracking table 204 for one or more data storage locations from which data that was included in the result 122 was retrieved. For instance, in the example implementation where the result 122 includes data retrieved from three different registers, the removal instruction 222 instructs the tracking module 202 to remove the address information for the three different registers from the tracking table 204.

In some implementations, an accelerator implementing the addressing system 116 (e.g., the processing-in-memory component 112) is prevented from overwriting data in one or more storage locations listed in the tracking table 204. For instance, the processing-in-memory component 112 is prevented from overwriting data at one or more registers 114 identified by address information in the tracking table 204. In this manner, data storage locations with address information represented in the tracking table 204 are considered as read-only data storage locations. Alternatively or additionally, the addressing system 116 enables an accelerator (e.g., the processing-in-memory component 112) to move data stored in one data storage location to a different data storage location. In such an implementation where the accelerator moves data prepared for consumption by the host 102 to a different location, the tracking module 202 updates the tracking table 204 to include address information for the different data storage location instead of address information for the data storage location from where the data was moved.

For instance, in an example scenario where one or more local data storage components of an accelerator (e.g., one or more registers 114 of the processing-in-memory component 112) become full, the accelerator moves data from the one or more local data storage components to a centralized data storage location that is accessible by the host 102. Continuing this example scenario, the processing-in-memory component 112, for instance, moves data prepared for consumption by the host 102 from a register 114 to a data storage location in memory 110. In response to moving the data from the register 114 to the data storage location in memory 110, the addressing system 116 updates the tracking table 204 to include address information for the data storage location in memory 110 in place of address information for the register 114 that was previously used to store the data.

In another example scenario, the accelerator (e.g., the processing-in-memory component 112) moves data stored in a first number of local data storage components (e.g., multiple registers 114) to a second number of local data storage components. For instance, in an implementation where multiple ones of the registers 114 are partially filled with data produced by the accelerator for consumption by a host (e.g., host 102), the accelerator moves data from the multiple ones of the registers 114 to a fewer number of the registers 114 by packing data into the fewer number of registers 114 until they become full, thereby freeing up additional registers 114 for use by the accelerator. In such an example scenario, the addressing system 116 updates the tracking table 204 to include address information for the second number of local data storage components (e.g., the fewer number of the registers 114) instead of address information for the first number of local data storage components (e.g., the multiple ones of the registers 114 from which data was relocated).

In some implementations, the coordinator module 216 is configured to abstain from generating the decrement instruction 220 and/or the removal instruction 222 until receiving an acknowledgment or indication from the host 102 that the result 122 was successfully received. Alternatively, in some implementations the coordinator module 216 generates the decrement instruction 220 and/or the removal instruction 222 responsive to the processing-in-memory component 112 transmitting the result 122 to the host 102 (e.g., without receiving an indication, an acknowledgment, or a confirmation from the host 102 of receiving the result 122). The addressing system 116 is configured to continue performance of the techniques described herein during operation of the processing-in-memory component 112, thus consistently updating the tracking table 204 and the counter 210 while generating notifications 212 and results 122 to provide data produced by the processing-in-memory component 112 to the host 102, without requiring use of an intermediary data storage location (e.g., without using memory 110).

FIG. 3 depicts a procedure 300 in an example implementation of responding to partial address memory requests.

A request for data produced by an accelerator is received from a host by the accelerator (block 302). The processing-in-memory component 112, for instance, receives the partial address request 120 from the host 102. In implementations, the partial address request 120 requests data stored locally at the accelerator (e.g., at one or more registers 114 of the processing-in-memory component 112) without including address information for one or more data storage locations being used to store the data locally at the accelerator.

At least one data storage location that includes the data produced by the accelerator is identified by the accelerator (block 304). To enable identification of the at least one data storage location, a table that tracks address information for data storage locations that include data produced by the accelerator is maintained by the accelerator (block 306). The tracking module 202 of the addressing system 116 implemented by the processing-in-memory component 112, for instance, maintains a tracking table 204 that includes address information for one or more data storage locations storing data prepared by the processing-in-memory component 112 for consumption by the host 102 (e.g., address information for one or more of the registers 114).

As part of maintaining the tracking table 204, the tracking module 202 adds address information to the tracking table 204 for each of one or more data storage locations that store information prepared by the accelerator (e.g., the processing-in-memory component 112) for consumption by the host 102. For instance, the tracking module 202 adds address information for one of the registers 114 in response to detecting a write operation by the processing-in-memory component 112 to the register, in response to detecting that the register is full, and so forth. In response to receiving the partial address request 120, the coordinator module 216 accesses the tracking table 204 and identifies address information for at least one data storage location currently storing data prepared by the processing-in-memory component 112 for consumption by the host 102.

A result is then output that includes the data produced by the accelerator (block 308). As part of outputting the result, the request is modified to include address information for the at least one data storage location using the table (block 310). The coordinator module 216, for instance, updates the partial address request 120 to generate a completed address request 218 that includes address information gleaned from the tracking table 204, where the address information specifies one or more local data storage locations for the accelerator (e.g., the processing-in-memory component 112) that include data ready for consumption by the host 102. The completed address request 218 is then used to retrieve data from data locations identified by one or more addresses included in the completed address request 218. The retrieved data is compiled to generate result 122, and the result 122 with the retrieved data is communicated to the host 102 (e.g., via the interface 106).

In some implementations, as further part of outputting the result, the address information for the at least one data storage location is removed from the tracking table (block 312). The coordinator module 216, for instance, transmits a removal instruction 222 to the tracking module 202 that causes the tracking module 202 to remove address information for the one or more data storage locations, from which data was obtained to generate the result 122, from the tracking table 204. In implementations, the accelerator (e.g., the processing-in-memory component 112) is configured to repeat performance of the blocks illustrated in FIG. 3 for additional requests for data received from the host (e.g., the host 102).

FIG. 4 depicts a procedure 400 in an example implementation of generating a request for data directly from an accelerator that produces the data.

Memory operation logic is loaded into an accelerator (block 402). For instance, memory operation logic 118 is loaded into the processing-in-memory component 112 from the host 102, from a dedicated portion of the memory 110, from another location within the memory 110, combinations thereof, and so forth. As an example, the memory operation logic 118 is loaded into the processing-in-memory component 112 at the instruction of an application kernel executing on the host 102. As another example, the memory operation logic 118 is loaded into the processing-in-memory component 112 upon an initialization of the system 100 (e.g., during boot of the system 100).

The memory operation logic is then executed by the accelerator (block 404). For instance, the memory operation logic 118 includes instructions and executing the instructions included in the memory operation logic 118 causes an accelerator, such as the processing-in-memory component 112, to generate a read command for execution by a host to retrieve data from one or more data storage locations local to the accelerator.

As part of executing the memory operation logic, the accelerator identifies at least one data storage location that includes data produced by the accelerator (block 406). The processing-in-memory component 112, for instance, employs an addressing system 116 and identifies address information for at least one data storage location local to the processing-in-memory component 112 (e.g., address information for at least one of the registers 114) storing data that is produced by the processing-in-memory component 112 for consumption by a host.

A tracking module 202 of the addressing system 116 implemented by the processing-in-memory component 112, for instance, maintains a tracking table 204 that includes address information for one or more data storage locations storing data prepared by the processing-in-memory component 112 for consumption by the host 102 (e.g., address information for one or more of the registers 114). A feedback module 208 of the addressing system 116 maintains a counter 210 that indicates a number of entries currently represented in the tracking table 204. In response to the counter indicating an integer value of one or more, the processing-in-memory component 112 accesses the tracking table 204 and retrieves address information included in the tracking table 204.

As further part of executing the memory operation logic, the accelerator generates a read command that, when executed by a host, causes the host to request data from the at least one data storage location (block 408). A result that includes the read command is then output to the host (block 410). The coordinator module 216 of the addressing system 116, for instance, generates a completed address request 218 that includes address information retrieved from the tracking table 204 for one or more data storage locations, where the one or more data storage locations store data prepared by the accelerator (e.g., the processing-in-memory component 112), for instance, for consumption by a processor device (e.g., the host 102).

In implementations, the completed address request 218 includes a read command that, when executed by the host 102, causes the host 102 to request data from at least one data storage location local to the accelerator (e.g., the processing-in-memory component 112). Alternatively or additionally, the result 122 is generated to include a partial address request read command such that, when executed by the host 102, the partial address read command causes the host 102 to transmit a partial address request 120 to the accelerator.

Thus, in some implementations, executing the read command included in the result 122 causes the host 102 to send a partial address request 120 to the accelerator (e.g., the processing-in-memory component 112). In other implementations, the read command included in the result 122 includes address information for the at least one data storage location in the processing-in-memory component 112, such that executing the read command causes the host 102 to request data directly from the data storage location address (es) specified in the read command. In some implementations, the processing-in-memory component 112 is configured to output a result 122 that includes a read command to a memory controller of the host 102, such that the read command is inserted into a queue of commands to be executed by the memory controller of the host 102.

The example techniques described herein are merely illustrative and many variations are possible based on this disclosure. Although features and elements are described above in particular combinations, each feature or element is usable alone without the other features and elements or in various combinations with or without other features and elements.

The various functional units illustrated in the figures and/or described herein (including, where appropriate, the host 102 having the core 108, the memory module 104 having the memory 110 and the processing-in-memory component 112, and the registers 114 and the addressing system 116 of the processing-in-memory component 112) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
an accelerator configured to:
    receive a request for data, the request not including address information for retrieving the data;
    identify at least one data storage location that includes data produced by the accelerator; and
    output a result that includes the data produced by the accelerator retrieved from the at least one data storage location.

2. The system of claim 1, wherein the request for data is received from a host that includes a core, wherein the accelerator is configured to output the result to the host.

3. The system of claim 2, wherein the core is a central processing unit, a graphics processing unit, a field programmable gate array, or a digital signal processor.

4. The system of claim 1, wherein the at least one data storage location comprises at least one of a register, a cache, a scratchpad, or a local store of the accelerator.

5. The system of claim 1, further comprising a memory of a memory module, wherein the accelerator is a processing-in-memory component of the memory module and wherein the processing-in-memory component is configured to produce the data by processing bits stored in the memory of the memory module.

6. The system of claim 1, wherein the accelerator is configured to produce the data independent of traffic on a connection between the accelerator and a host from which the request for data was received.

7. The system of claim 1, wherein the accelerator is further configured to monitor the at least one data storage location and transmit a notification that the data produced by the accelerator is available for consumption responsive to detecting a write operation to the at least one data storage location.

8. The system of claim 7, wherein the notification does not include information specifying an address of the at least one data storage location and the request for the data produced by the accelerator is received in response to the accelerator transmitting the notification.

9. The system of claim 1, wherein the accelerator is further configured to maintain a table that includes information describing one or more data storage components including data that is prepared for consumption by a host, wherein the accelerator is configured to identify the at least one data storage location using the table.

10. The system of claim 9, wherein the accelerator is further configured to remove an entry from the table for the at least one data storage location in response to outputting the result.

11. The system of claim 10, wherein the accelerator is configured to remove the entry from the table for the at least one data storage location in response to receiving an acknowledgment from a host indicating that the result was successfully received.

12. The system of claim 1, further including a plurality of accelerators, wherein in response to receiving the request for data, each of the plurality of accelerators:
    identify at least one data storage location that includes data produced by the accelerator; and
    output a result that includes the data produced by the accelerator retrieved from the at least one data storage location.

13. An accelerator configured to:
identify, independent of traffic on a connection between the accelerator and a processing device, at least one data storage location that includes data produced by the accelerator;
generate, independent of traffic on the connection, a read command that causes the processing device to request data from the at least one data storage location; and
output the read command to the processing device.

14. The accelerator of claim 13, wherein the processing device includes a memory controller and a core, wherein the accelerator is configured to output the read command to the memory controller of the processing device.

15. The accelerator of claim 13, wherein the accelerator is a processing-in-memory component of a memory module and the at least one data storage location comprises a location in memory of the memory module.

16. A method comprising:
receiving, at an accelerator, a request for data from a host, the request not including address information for retrieving the data;
identifying, by the accelerator, at least one data storage location that includes data produced by the accelerator; and
outputting, by the accelerator, a result that includes the data produced by the accelerator retrieved from the at least one data storage location.

17. The method of claim 16, further comprising producing, by the accelerator, the data by processing bits stored in memory of a memory module.

18. The method of claim 17, wherein producing the data is performed independent of traffic on a connection between the accelerator and the host.

19. The method of claim 16, wherein the host includes a core, wherein the core is a central processing unit, a graphics processing unit, a field programmable gate array, or a digital signal processor.

20. The method of claim 16, wherein the at least one data storage location comprises at least one of a register, a cache, a scratchpad, or a local store of the accelerator.

* * * * *